(No Model.)
W. H. DODGE.
BAND SAW PULLEY.
No. 348,269. Patented Aug. 31, 1886.
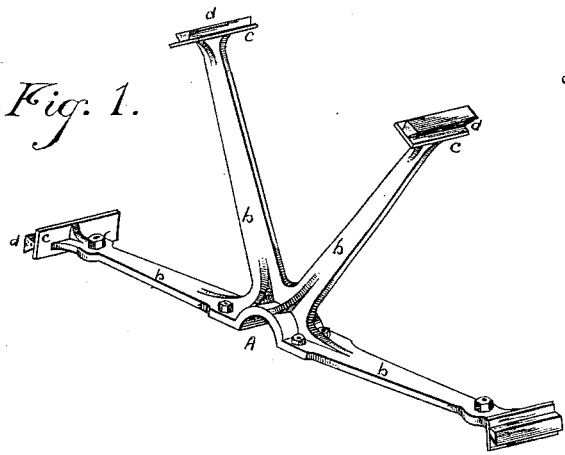
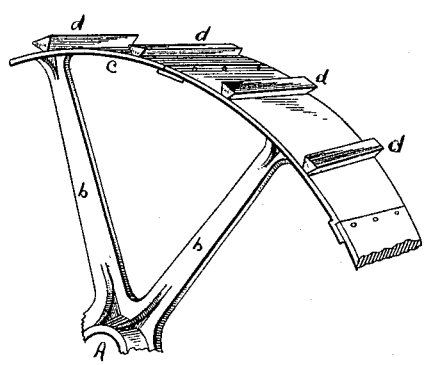
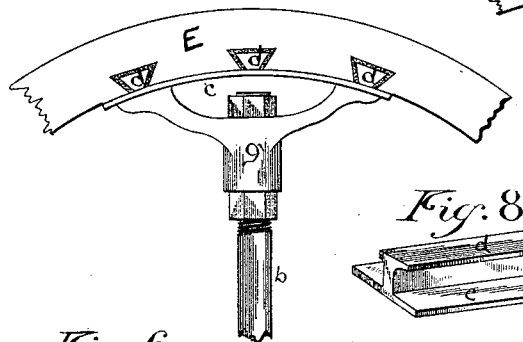
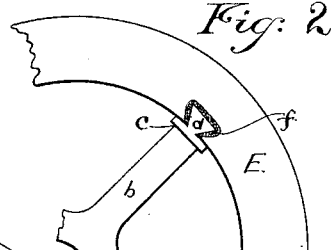
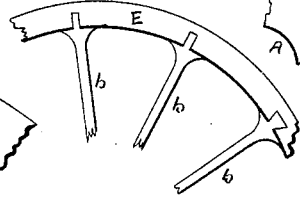
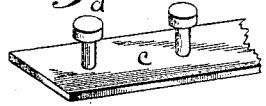
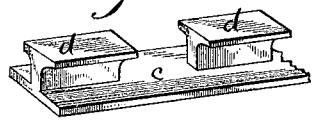
WITNESSES:
J. B. McGirr.
W. H. Cooper.
INVENTOR.
W. H. Dodge
By his Atty
R. D. O. Smith

UNITED STATES PATENT OFFICE.

WALLACE H. DODGE, OF MISHAWAKA, INDIANA.

BAND-SAW PULLEY.

SPECIFICATION forming part of Letters Patent No. 348,269, dated August 31, 1886.

Application filed April 6, 1886. Serial No. 197,967. (No model.)

*To all whom it may concern:*

Be it known that I, WALLACE H. DODGE, of Mishawaka, in the county of St. Joseph and State of Indiana, have invented new and useful Improvements in Band-Saw Pulleys, of which the following is a specification.

My invention relates to that class of pulleys which are wooden-faced and provided with iron hubs and spokes.

So far as I am aware, pulleys having iron centers and spokes have always heretofore been made in one of two ways: first, with entire wooden rims, and having the outer ends of the iron spokes fastened to the inner surface of said wooden rim by bolts or screws; or the pulley has been made with an iron rim, and the wooden face or lagging secured thereto by bolts or screws. Both modes are defective, and the defect is entirely obviated by my invention, which consists in a mode and device for attaching the wooden rim to the iron arms or spokes, preferably with an interlocking joint, which secures permanency and solidity of union without the use of screws or bolts.

In the accompanying drawings, Figure 1 is a perspective view of one of my iron hubs with its spokes or arms attached to, but separate from its wooden rim. Fig. 2 is a plan showing the mode of joining the spokes to the wooden rim. Fig. 3 is a perspective view showing a modification to secure a number of points of attachments greater than the number of spokes. Fig. 4 is an elevation showing the mode of attaching wrought-iron spokes to the rim. Fig. 5 is a plan showing a modification. Figs. 6, 7, 8, and 9 are perspective views showing different modes of anchoring the T-head in the rim.

A is the hub, preferably of cast-iron, provided with metallic spokes or arms $b$, which may be integral with the hub, or may be separable therefrom. For some purposes it is preferable to make them integral, being cast with the hub; but for large wheels, or those required to bear heavy pressure, as in large band-saw machines, it is preferable to make them of wrought metal and separable from the hub. At the extremity of each arm there is a cross or T head, $c$, in length equal to about one-half the face width of the pulley, though, if desired, it may be equal to said width, or of any other proportion than that stated. The cross-head $c$ has upon its outer side a rib, $d$, which I prefer to make undercut, or wider at its outer surface than at its junction with said cross-head and which, for convenience and by preference, is made dovetailed in cross-sections, though other forms may be used in many cases without material difference in effect. The rim E of the pulley is preferably made of wood in the well-known way—that is to say, it is built up of segments cut from boards or planks glued together, so that end joints are broken or lapped and the direction of the grain crossed. Notches $f$ are cut in the inner peripheral surface of the rim E, corresponding in position with and adapted to receive the ribs $d$. These notches may be accurately cut to fit the dovetailed ribs $d$, and said ribs may be made thinner at one end than at the other, as described in the application of Chas. McNeal, No. 197,563, whereby their union with the rim may be made solid and firm by a wedge, as described in said application; but that is not my invention, and is only referred to here for the purpose of this disclaimer. I prefer to cut the notches $f$ larger than the ribs $d$, but approximately the same form, so that when said ribs are inserted there will be a little space within the notch all around the rib. This space I fill with some plastic or semi-fluid material which will harden without shrinking, and for this purpose melted sulphur I have found to be most satisfactory, as it possesses great hardness and rigidity when cold, and is not influenced by any treatment to which the pulley may be subjected in finishing. In this way the arms or pockets are firmly bedded in the material of the rim, and no strain which the pulley is adapted to bear will or can cause a separation of the rim from the arms. When the rim is attached to the arms by bolts or screws, the substance of the rim is perforated for the passage of the bolt, and is thereby weakened, and the areas of contact being comparatively small, there is under strain a constant tendency to enlarge said holes and loosen the hold of the holding-bolts. In some cases it may be desirable to provide points of engagement between the spokes and greater in number than the number of spokes, and in such cases I extend the T-head $c$ laterally and place upon it two or more ribs, $d$.

When wrought-metal spokes are employed,

I have provided for the outer end of each arm a head like that shown at $g$, adjustable on the arm $b$; but the form of said head may be modified to suit the circumstances of any case. Sometimes, especially when the rims are heavy, it will not be necessary to key fast all the ends of the spokes, but only those near the ends of the sections, intermediate spokes being merely bedded. Such modification is shown in Fig. 5.

When a plastic or fluid bedding material like melted sulphur or cement compounds is employed, the forms of the spoke ends $d$ may be greatly varied. Suggestive forms are shown in Figs. 6, 7, 8, and 9. It is apparent that the form of the parts which project into the notches may be greatly varied without in any degree changing the result, which depends upon the firm embedment of a part of the arm in the substance of the rim of a wooden-rimmed pulley, in contradistinction to the fastening together of the rim and spokes by separable or removable fasteners, like screws or bolts, so that when the hub and spokes are caused to revolve the rim is positively pushed by each spoke embedded in it, instead of being pulled by screws or bolts which pass between them.

Having described my invention, I claim as new—

1. In the manufacture of pulleys having wooden rims and metallic arms, the mode of attaching said arms and rims herein described—that is to say, providing each arm with transverse T-head projections or ribs, inserting said projections loosely into notches made in the inner peripheral surface of said rim, and filling the spaces within the several notches and around said ribs with a non-shrinking substance, such as sulphur, substantially as set forth.

2. A pulley having a wooden rim provided with notches $f$, and a metallic hub and spokes provided with projections or ribs adapted to extend into said notches, combined with a non-shrinking filling of suitable material capable of being applied in a fluid or plastic condition, and afterward hardening, substantially as set forth.

3. A pulley having a wooden rim provided with notches $f$, and a metallic hub and spokes, provided at the end of each spoke with one or more transverse undercut ribs adapted to extend into said notches, combined with a non-shrinking filling of sulphur, substantially as set forth.

4. A pulley having a wooden rim provided with notches $f$, and a metallic hub and spokes, each spoke having a separable head, $g$, provided with projections $d$, adapted to extend into said notches, and the notches adapted to be filled around said projections with a non-shrinking material to pack said projections in said notches, substantially as set forth.

WALLACE H. DODGE.

Witnesses:
ED. A. JERNEGAN,
R. D. O. SMITH.